United States Patent [19]
Kunnemeyer
[11] Patent Number: 4,883,546
[45] Date of Patent: Nov. 28, 1989

[54] PROCESS FOR THE MANUFACTURE OF WOOD FIBER BOARDS

[76] Inventor: Otto Kunnemeyer, Paschenburg 5, 4934 Horn-Bad Meinberg 1, Fed. Rep. of Germany

[21] Appl. No.: 86,406
[22] Filed: Aug. 17, 1987
[30] Foreign Application Priority Data
Aug. 30, 1986 [DE] Fed. Rep. of Germany ....... 3629586
[51] Int. Cl.$^4$ ........................ B29C 67/02; B32B 31/20; B32B 31/22
[52] U.S. Cl. .................................... 156/62.2; 156/154; 264/113; 264/119; 264/162
[58] Field of Search .............. 156/154, 279, 281, 62.2; 264/109, 113, 119, 162

[56] References Cited

U.S. PATENT DOCUMENTS 3,188,367 6/1965 Gottschalk .......................... 264/162
3,243,327 3/1966 Hoppeler ............................ 264/162
3,370,997 2/1968 Hoppeler ............................ 264/162
3,447,996 6/1969 Himmelheber ...................... 156/279
3,639,200 2/1972 Elmendorf .......................... 156/154

FOREIGN PATENT DOCUMENTS 0065941 12/1982 European Pat. Off. ............ 264/162

*Primary Examiner*—George F. Lesmes
*Assistant Examiner*—J. Davis
*Attorney, Agent, or Firm*—Warren N. Low

[57] ABSTRACT

There is proposed a process for the manufacture of wood fiber boards, wherein by far the largest part of the outer layers to be conventionally sanded away no longer consists of wood fibers but of wood dusts of a defined particle size, a material which is available as waste from other consolidations of wood raw materials. By employing the process of the invention, it also is possible to achieve an only small density drop towards the center of the board, so that this process is particularly suitable for the manufacture of medium density wood fiber boards with a weight of 600 to 950 kg/m$^3$.

8 Claims, No Drawings

PROCESS FOR THE MANUFACTURE OF WOOD FIBER BOARDS

The present invention relates to an improved process for the manufacture of wood fiber boards uniquely employing fine wood dust as the initially manufactured surface layers as set forth more fully hereinafter. Wood fiber boards are manufactured with a density of 600 to 1,100 kg/m$^3$, depending on the thickness of the board. They are ordinarily bonded with urea-, melamine-, phenolic resins or with isocyanate. Wood fiber boards are ordinarily produced in thicknesses of 2 to 50 mm. A substantial area of application, moreover, is furniture construction. In contrast to particle boards, the wood fiber board is formed particularly homegeneous from the finest wood fibers. The board can be varnished or coated. Special edge bonding techniques are as a rule not required in the case of thick boards. The good workability of the flat surfaces makes possible a particularly large multiplicity of shapes. The prerequisite here is the homogeneous structure and as uniform a density distribution as possible throughout the total board thickness. The density may thus decrease toward the center of the board only as little as possible.

As raw material for the manufacture of wood fiber boards serve predominantly wood chips from coniferous trees or deciduous trees, which are charged in desired degree of fineness to a pulping machine, e.g., a defibrator.

The wood fibers are subsequently coated with adhesive and dried to a wood moisture level of about 6 to 15% of absolute dryness.

The adhesive-coated wood fibers are then mechanically scattered by means of forming heads at a forming station onto a conveyor or screen, where a continuous fiber web is formed. The still loose fiber web is precompacted with an unheated press to about 40% of the thickness of the layer. The still loose bonding resulting therefrom assures a good transport of the fiber web. Ordinarily, the precompacted fiber web is divided into individual sections from which the wood fiber boards are obtained by pressing under pressure and temperature. After pressing, the boards are cooled, and the upper surface and the lower surface are sanded. Especially in the case of fiber boards of medium thickness, the fiber matting can be made denser only around the periphery by increasing the pressure, as the temperature increases within the matting towards the center. The relatively poor heat conductivity of the wood fiber web thus requires slow compacting by a slow increase of pressure up to the predetermined thickness. At the same time, disruption of the bond bridges in the region of the outer layer of the wood fiber boards because of a relatively long lasting temperature effect must so far be contended with as a drawback. The result is that the insufficiently solid top layers must be subsequently sanded away down to the formed board core. The sanding loss lies, according to the board thickness, between 20 and 30% in the case of boards 10 to 20 mm thick.

The costs for the high value material employed, which is lost in this manner, are high. The considerable amount of material sanded away brings with it problems of waste disposal. Even the ordinarily employed here burning of the decaying, sanded away wood fibers still is problematic.

Should the pressing process be carried out without taking into account the thorough warming of the fiber web, wood fiber boards are obtained especially in the density range of 600 to 950 kg/m$^3$, which exhibit a very high drop of density throughout their thickness from the outer zone to the board center, and they thus would possess only to very small degree the great advantage of a wood fiber board over a particle board.

The present invention has therefore the objective to provide a process for the manufacture of wood fiber boards, which, retaining all the particular properties of the wood fiber boards and retaining a homogeneous board structure, will avoid as far as possible the heretofore occurring sanding loss of the high value board material.

The solution according to the invention is obtained by the unique provision of wood dust layers covering both faces of the wood fiber web prior to pressing and bonding the now dust covered wood fiber web.

The process of the invention offers a possibility of manufacturing fiber boards which do not exhibit the abovedelineated disadvantages. The density drop throughout the entire board thickness is only small and the sanding of the outer zones barely affects the fiber material employed for the wood fiber boards.

The layers of wood dust of a given particle size applied on both sides, which are pressed together with the fiber web, during pressing under pressure and heat, in practice form a protective layer for the wood fiber web, so that it is no longer destroyed by the temperature effect in its top layer areas. Moreover, the wood dust has the advantage of being extraordinarily econmical and apt to be very well sanded away. The waste disposal can occur in a very simple manner by burning.

This manner of proceeding assures that the loss of the very expensive wood fiber boards material does not in practice occur any more, sand, measured across the board thickness, only an extremely small density drop from the outside in is noted.

The process can be designed so as to sand away practically only the compressed protective layers. On the sides serving decorative purposes in a subsequent application case, it naturally will be useful, with a view to the attainment of a good sanded image and thus of a corresponding surface, that sanding is done so deeply that reliably no wood dust particles remain on the surface of the sanded boards, so that a thin border layer of the wood fiber board also is sanded away. On the other hand, there also are conceivable application cases wherein on at least one side of the wood fiber board the retention of a small portion of the protective layer can be advisable. In such a case, the protective layer is sanded away only partially.

It should also be stressed that the wood dust employed here as the protective layer for the pressing operation does not bring with it any negative or undesirable impairment in the surface region of the wood fiber board.

For the formation of the protective layer, adhesive-coated or also uncoated wood dusts of a defined particle size can be employed. When, for example, wood fibers are present which still bond sufficiently when wood dusts are applied to their surfaces, one can dispense with the otherwise required adhesive-coating of the wood dusts.

The particular value of the dusts of a defined particle size employed here for the formation of the protective layer results from that filter- and screen dusts, grating chips, fibers from waste material, and such can be employed here without more. It is especially possible here to use, either entirely or in desired proportions, wood dust particles of a defined particle size from the manufacture of particle boards. Here, it must be stressed again that wood dusts from the combustible portion of the sanding dust and of the screen dust of a neighboring particle board production can be employed, so that in practice these wood dusts are thus ordinarily burned only after fulfilling their protective layer function, removed as waste after the second sanding in connection with the wood fiber board production of interest here.

A continuing reuse, for example, for further layer formation, is not recommended because the material in the course of multiple reuse can become enriched in corundum from the sanding belts and, on the other hand, in hardened surplus adhesive or mineral contaminants from the raw wood, so that this could lead to injury to the wood fiber board surface and to damaging of the sanding belts.

It is possible nevertheless, and also provided for according to a preferred embodiment of the process, to add again in practice a smaller proportion of the material first sanded away as a filler for the formation of another layer from the surface wood dust. Should the wood dust be adhesive-coated, adhesives in smaller amount and of lesser quality than those used for adhesive-coating of the fibers can be employed.

In a further preferred embodiment of the process, other technical processing aids can be added without more to the wood dust, in each case in an exact amount, which have a positive effect in desired manner on the properties of the wood fiber board and/or its production rate.

One should especially mention the addition to the wood dust of chemicals which reduce the formaldehyde content of the wood fiber boards. This is possible, for example, by admixing urea or ammonium carbonate.

Further, the hardening of the bonding agent during pressing can be advantageously accelerated by means of the corresponding hardeners such as, e.g., ammonium chloride, ammonium sulfate, or formic acid in the case of urea resins.

Also, the addition of water as a technical processing aid to the adhesive-coated or uncoated wood dust should be mentioned. The added water evaporates inside during pressing, condenses there, and thus effects an accelerated and increased heat transport into the center of the board, wherefrom an increase of the specific production rate of wood fiber boards of this type results.

It is further possible advantageously to add to the wood dust a fungicide, which during pressing becomes lodged in the top layer regions of the wood fiber board. One can think, for example, of boric acid or Xyligen (registered trademark).

A preferred processing aid to be also added is an agent imparting hydrophobic properties, which likewise becomes lodged in the top layer region of the wood fiber board, whereby water uptake thus is reduced, which is of advantage in the special application area of wood fiber boards of this kind in humid spaces.

It is understood that several of the above discussed processing aids can be added simultaneously in any desired combination.

In a particularly preferred example of the practice of the process of the invention, one proceeds first of all as usual in the manufacture of the wood fiber boards, up to and including the precompacting of the fiber web. Before pressing, the fiber web is covered on both sides with a layer of adhesive-coated wood dust, wherein the thickness of the dust layer is adjusted in such a manner that, after pressing together with the fiber web. it is about 0.8 mm. Thereby, it is assured with certainty that all the wood dust particles are removed, the loss of wood fiber boards is minimal, and the surface of the resulting wood fiber boards shows a defect-free polish. The added technical processing aids are admixed beforehand with the adhesive-coated wood dust, according to their requirements and application purpose.

Departing from the above example of reduction to practice, the thickness of the layer, especially in the case of thick wood fiber boards, can be adjusted in such a manner that after pressing together with the wood fiber web, it amounts to up to 3 mm. Sanding is then set for the corresponding thickness.

I claim:

1. A process for the manufacture of wood fiber boards comprising the steps of, coating wood fibers with adhesive,
forming the same into a fiber web,
covering the wood fiber web on both sides with a layer comprising substantially entirely fine wood dust to a predetermined thickness,
subjecting the web and the layers thereon to heat and pressure to compact the same into a board, and,
removing substantially the entire wood dust layers,
thereby to produce a wood fiber board wherein the wood fibers thereof have not been subjected to any substantial surface removal.

2. The process of claim 1 including the step of selecting said wood dust from the group consisting of sanding dusts, filter screen dusts, grating chips, fine waste fibers, fine particle board materials, or combinations thereof.

3. The process of claim 2 including selecting the readily combustible portions of the sanding dusts.

4. The process of claim 1 including the step of applying adhesive to said wood dust before said heat and pressure step.

5. The process of claim 1 wherein said covering and heat and pressure steps produce a wood dust layer thickness of up to 3 mm.

6. The process of claim 5 wherein said covering and heat and pressure steps produce a wood dust layer thickness of about 0.8 mm.

7. The process of claim 1 wherein said removing step includes sanding the wood dust layers, and the further step of recycling the sanded wood dust for use as wood dust layers on succeeding wood fiber webs.

8. The process of claim 1 including the further step of admixing with the wood dust before said covering step a treatment material selected from the group of: chemicals for reducing wood fiber board formaldehyde content, chemicals for accelerating the hardening of the adhesive, water, fungicides, hydrophobic agents, chemicals to enhance the properties of the board, or combinations thereof.

* * * * *